(12) United States Patent
Corning (10) Patent No.: US 11,847,580 B2
(45) Date of Patent: Dec. 19, 2023

(54) SMART EDGE CO-PROCESSOR (71) Applicant: NUSANTAO, INC., Cupertino, CA (US)

(72) Inventor: Raymond Vincent Corning, Lander, WY (US)

(73) Assignee: NUSANTAO, INC., Cupertino, CA (US)

( * ) Notice: Subject to any disclaimer, the term of this patent is extended or adjusted under 35 U.S.C. 154(b) by 0 days.

(21) Appl. No.: 17/883,318

(22) Filed: Aug. 8, 2022

(65) Prior Publication Data
US 2022/0374555 A1 Nov. 24, 2022

Related U.S. Application Data (62) Division of application No. 16/838,676, filed on Apr. 2, 2020, now Pat. No. 11,416,758.

(60) Provisional application No. 62/840,822, filed on Apr. 30, 2019, provisional application No. 62/828,363, filed on Apr. 2, 2019.

(51) Int. Cl.
| | | |
|---|---|---|
| *H04L 9/06* | (2006.01) | |
| *G06N 5/046* | (2023.01) | |
| *H04L 41/0806* | (2022.01) | |
| *G06F 21/87* | (2013.01) | |
| *H04L 9/40* | (2022.01) | |
| *G06F 21/85* | (2013.01) | |
| *H04L 9/00* | (2022.01) | |

(52) U.S. Cl.
CPC ............ *G06N 5/046* (2013.01); *G06F 21/85* (2013.01); *G06F 21/87* (2013.01); *H04L 9/0637* (2013.01); *H04L 9/0643* (2013.01); *H04L 41/0806* (2013.01); *H04L 63/08* (2013.01); *H04L 63/123* (2013.01); *H04L 9/50* (2022.05)

(58) Field of Classification Search
CPC ....... H04L 9/0637; H04L 9/0643; H04L 9/50; H04L 63/08; H04L 63/123; G06F 21/87; G06F 21/50; G06N 5/046
USPC .......................................................... 713/168
See application file for complete search history.

(56) References Cited

U.S. PATENT DOCUMENTS

| | | | | |
|---|---|---|---|---|
| 9,661,080 | B2* | 5/2017 | Haleem | H04L 45/7453 |
| 11,105,850 | B2* | 8/2021 | Trantham | G01R 31/31719 |
| 2005/0193220 | A1* | 9/2005 | Little | G06F 21/79 |
| | | | | 726/5 |
| 2011/0199121 | A1* | 8/2011 | Yang | H04L 7/0012 |
| | | | | 326/94 |

(Continued)

FOREIGN PATENT DOCUMENTS

EP 2372595 A1 * 10/2011 ....... G01R 31/31719

*Primary Examiner* — Samson B Lemma
(74) *Attorney, Agent, or Firm* — WOMBLE BOND DICKINSON (US) LLP; Joseph Bach, Esq.

(57) ABSTRACT

A system of smart edge sensors, wherein security and encryption is pushed to the edge of the network. In one example, an electronic device includes several sensors. The device is operated by a microprocessor. A plurality of smart edge devices are each interposed between a respective sensor and the microprocessor and intercepts communication between the sensor and the microprocessor. The smart edge device encrypt any data output by the sensor, and decrypt any data received from the microprocessor. A JTAG access is connected to a co-processor where executes a JTAG dongle to authenticate the sensor and an interface with the sensor.

3 Claims, 4 Drawing Sheets

(56) References Cited

U.S. PATENT DOCUMENTS

| | | | |
|---|---|---|---|
| 2012/0079332 A1* | 3/2012 | Doumenjou | G01R 31/31855 714/E11.155 |
| 2013/0226485 A1* | 8/2013 | Pietrowicz | H04L 63/0254 702/62 |
| 2013/0241746 A1* | 9/2013 | McKinley | G01R 29/18 340/870.02 |
| 2017/0201585 A1* | 7/2017 | Doraiswamy | H04L 41/0806 |
| 2017/0230340 A1* | 8/2017 | Chou | H04L 51/212 |
| 2019/0042851 A1* | 2/2019 | Varadarajan | G06V 40/20 |
| 2019/0349434 A1* | 11/2019 | Haleem | H04L 45/7453 |
| 2021/0307189 A1* | 9/2021 | Lucero | H05K 1/141 |

* cited by examiner

SMART EDGE CO-PROCESSOR

RELATED APPLICATIONS

This application is a divisional of U.S. patent application Ser. No. 16/838,676, filed on Apr. 2, 2020, which claims priority benefit to U.S. Provisional Application No. 62/840,822, filed on Apr. 30, 2019, and U.S. Provisional Application No. 62/828,363, filed on Apr. 2, 2019, which are incorporated herein by reference in their entirety. This application is also related to U.S. application Ser. No. 16/366,971, filed Mar. 27, 2019, the disclosure of which is incorporated herein by reference in its entirety.

BACKGROUND

1. Field

This application relates to sensors which transmit data to electronic devices.

2. Related Art

Various systems are known in the art for sensing environmental events, processing data relating to the environmental events, and transmitting such data outside of the system, e.g., over the Internet, a WiFi channel, a cellular network, etc. Such systems generally have plurality of sensors to detect the environmental events and generate electric signal corresponding to the sensed events.

In the context of this disclosure, the term sensor is used to indicate any device that bridges the physical world and electronic signal processing world. In this sense, it can be said that a sensor bridges the physical world and the digital world, although in the context of this disclosure analog signals are included in the definition of digital world. For example, a microphone senses sound in the form of physical pressure changes and generates corresponding electronic signal for processing by an electronic device. Similarly, a speaker performs the reverse action by receiving electrical signal from the electronic device and generating pressure changes in the physical world to generate sound. Under the definition of this disclosure, for convenience a speaker, while strictly speaking may be considered as actuator, is also considered a sensor, as it bridges the physical world and an electronic signal processing device (e.g., an amplifier). Thus, the descriptions provided herein regarding sensors, are equally applicable to actuators. A physical action, on the other hand, describes an event in the physical world existing outside of the electronic signal processing, such as a processing device and a network. That is, reference to physical action excludes the electronic signal generation, manipulation and transmission.

Using the definition described herein, it can be seen that an electronic device, such as a cellphone, has multiple sensors: a microphone, a speaker, a light sensor, a distance sensor, an accelerometer, etc. These sensors exchange data with the main processor of the device. The processor may operate on the data and may also transmit the data outside of the device. In that sense, the sensors are at the edges of the network. Generally, any data generated by a sensor from a physical action is generated at an edge of the network, and is transmitted into the network via a processor, and any data destined to a sensor travels the network until it reached the sensor at the edge, where it is transformed into a physical action.

With the proliferation of mobile devices, the number of sensors is multiplied several times fold. Additionally, devices are being augmented by additional sensors in the form of wearable technology. Similarly, the Internet of Things, IoT, adds many devices that include sensors at the edge of the network, e.g., smart thermostats, smart watering timers, security cameras and door rings, etc. The data generated by all of these devices should be maintained confidential and secured. For example, it has been reported that hackers were able to hack security cameras and baby monitors and observe the video streams.

Sensor architecture has remained largely unchanged for decades and remains rather primitive in implementation. Typically, sensors provide either an analog or digital signal that is accessed over a serial bus at the bit level using a C level application programming interface (API).

Due to the low-level application programming interface and minimal processing, sensor data is typically provided in a raw format that requires substantial pre-processing for use by applications, such as artificial intelligence applications, in order to extract meaningful features from the raw data. This preprocessing and transformation can take up to 80% of data scientists' time and effort building artificial intelligence applications.

3. Problem to be Solved

In general, security measures are targeted at two areas of vulnerability: the communication link, e.g., the Internet, and the devices themselves, i.e., the processor and operating system. However, once a hacker is able to find an opening in one of these vulnerabilities, the hacker is able to obtain the sensors' data. For example, the hacker may be able to eavesdrop by setting up a video and/or audio feed from the hacked device to the hacker's device.

Regardless of the sophistication of the security software installed on a computing device, privacy and security is not practical when implemented on top of a processor with over 100 million gates, running an operating system with 100 million lines of code, in a browser with 5 million lines of code. The Internet of Things (IoT) and artificial intelligence (AI) applications dramatically increase the attack surface area, making enforcement of security and privacy impossible using current techniques.

Because of the lack of compute resources available in the sensor, data is preprocessed and/or secured later at either the device level, through a connected device such as a cell phone, or at a network resource located in the cloud. Generally, local devices, such as mobile devices, lack sufficient processing resources and are therefore forced to send raw data over power intensive communication technologies such as Bluetooth, Ethernet or Wi-Fi. All raw data is transferred upstream for processing leading to increased power consumption and bandwidth utilization.

Also, due to the lack of local resources at the sensor and even local device level, the sensor's data cannot be properly secured until reaching more advanced resources farther upstream leaving large gaps in information security. Privacy is also compromised as the raw sensor data can be used for alternative purposes by upstream resources that may be outside the control of the sensor owner. The sensor owner has absolutely no control of data that is sent in unencrypted format outside of their area of control.

Accordingly, a need exist for a system which is able to introduce processing at the sensor level, prior to having the data sent out of the sensor. Preferably, the system also is able to withstand hacking attacks and protect data, even in the event of a breach of the communication network or a processing environment.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the invention provide a system architecture that protects against unauthorized access to sensors' data. The system architecture implements endpoint control and pushes security and encryption measures to the edges of the network, i.e., to the sensors.

Various disclosed embodiments enable increased security by encrypting sensors data prior to providing the data to the device's processor. Thus, if a hacker is able to breach the communication network or the security of the device itself, the hacker can only reach encrypted sensor data and, unless the hacker has a key, the encrypted data cannot be read or used.

Embodiments of the invention provide an encryption module having an input configured for receiving raw sensor data, encrypt the data, and output the encrypted data to a microprocessor of a device. The encryption module is exterior to the device's microprocessor and operates independently of the device's microprocessor. Consequently, a hacker that gains access to the device's microprocessor cannot alter the operation of the encryption module, and thus can't reach the sensors' raw data.

Disclosed embodiments provide a sensor co-processor that adds intelligence to digital I/O and is designed to be implemented at the furthest edge of the network, directly adjacent to the I/O which provides information about the physical world to the digital world. The co-processor may be directly integrated with the sensor, e.g., speaker, microphone, headphones, etc., to provide source to sink management and encryption of sensor data streams.

In disclosed embodiments, the sensor co-processors can validate their environment during their boot process in order to identify hardware tampering. Additionally, the pre-processing functionality can be used to identify and/or mitigate external physical and/or cyber-attacks.

The pre-processing can also be used to filter the raw data, such that only relevant and/or usable data is sent to the network, thus reducing the power and bandwidth requirements. Moreover, since only relevant and/or usable data is sent to the network, it reduces the efforts and time required upstream to pre-process and extract the data.

Disclosed aspects include a smart edge module configured to sense physical events and output a corresponding electronic signal, comprising: a sensor sensing physical event and generating a raw signal corresponding to the physical event; a co-processor receiving the raw signal and generating an encrypted signal therefrom; a secured interface inserted between the sensor and the co-processor and enabling communication between the sensor and the co-processor; a communication interface handling communications between the co-processor and devices external to the smart edge module; and, an authentication module authenticating the construction and functionality of the sensor and the secured interface. The authentication module may comprise a JTAG dongle. The co-processor is generally mounted on a PCB board, and the PCB board comprises a JTAG access point. The JTAG access point may be embedded in epoxy. Also, the secured interface and the JTAG access point may be embedded in epoxy.

In other aspects, the smart edge module may further comprise an encrypt/decrypt module configured to decrypt incoming communication received by the communication interface and inspect a header within said communication to determine validity of the communication. The communication interface may comprise a bus adapter executing WebHook and Get/Post calls. The smart edge module may further comprise a pre-processing module configured to filter or transform the raw data received from the sensor prior to encryption. The smart edge module may further comprise a smart contract module and wherein the authentication module performs authentication according to parameters specified within the smart contract module. The co-processor may also be coupled to a plurality of sensors.

In further aspects, an electronic device is provided, comprising: a device processor executing a device operating system (OS); a device bus; a device memory coupled to the device bus; a plurality of sensors; a JTAG access point; and, at least one security module, interposed between at least one corresponding sensor of the plurality of sensors and the device bus, the security module coupled to the JTAG access point and configured to execute a JTAG dongle to authenticate at least the plurality of sensors. The electronic device may further comprise a plurality of secured interfaces, each interposed between a corresponding senor and the security module and each having connections to the JTAG access point. The JTAG access point and the connections to the JTAG access point can be embedded in epoxy. The security module may further comprise: module memory incorporating a smart contract module specifying parameters for authentication process performed by the JTAG dongle. The security module may comprise an interference module validating external environment to detect physical attacks.

In other aspects, a method for fabricating a smart edge module is provided, comprising: coupling a sensor to a secured interface; providing a PCB board with JTAG access point; forming a first connection between the secured interface and the JTAG access point; installing a pre-processor on the PCB board; forming a second connection between the pre-processor and the JTAG access point; forming a physical barrier to prevent physical access to the JTAG access point. Forming a physical barrier may comprise embedding the JTAG access point in epoxy.

According to yet further aspects, in an electronic device having at least one sensor and at least one pre-processor communicating with the sensor via a secured interface, a method is provided, comprising: upon boot of the device, causing the co-processor to: read authentication parameters from a smart contract stored in memory of the electronic device; execute a JTAG dongle to authenticate and validate the sensor and the secured interface according to the authentication parameters. The method may further comprise: during continued operation of the electronic device, causing the co-processor to receive sensor signal via the secured interface and execute a filter module on the sensor signal to generate reduced data and encrypt the reduced data. The method may further comprise during continued operation of the electronic device, causing the co-processor to execute an interference module on the sensor signal to detect physical attack against the sensor.

A system according to disclosed embodiments includes an electronic apparatus having a plurality of sensors; a device microprocessor for controlling the operation of the electronic apparatus; a plurality of encryption modules, each coupled between the device's microprocessor and one of the plurality of sensors; each of the encryption modules configured for intercepting output signal of a corresponding sensor, encrypt the output signal, and communicate the encrypted output signal to the device's microprocessor. At least one of the encryption modules further being configured to receive an input signal from the device's microprocessor, decrypt the input signal, and communicate the encrypted input signal to a corresponding sensor.

In certain embodiments, a smart edge module is provided, configured to be inserted between a communication bus of an electronic device and a sensor, the electronic device having a device processor running a device operating system, the smart edge module comprising: an interface adapter configured for receiving raw data from the sensor; a bus adapter configured for handling communications with the device bus; a module bus coupled to the interface adapter and bus adapter; a module processor configured for encrypting the raw data; and a module memory storing a module operating system. The smart edge module may be implemented as a system on a chip.

In some embodiments, the module processor may be configured to encrypt the raw data according to instructions of a local contract stored in the module memory. The local contract may be a blockchain contract. The smart edge module may further comprise a command filter configured to discard unauthorized communication directed at the module processor. The command filter may be configured to decrypt incoming communication received by the bus adapter and inspect a header within said communication to determine validity of the communication.

In certain aspects, the smart edge module may further comprise an encryption accelerator configured for acceleration encryption of the raw data. It may further comprise a device driver configured to intercept communication on said device bus directed to said smart edge module, and perform entropy test on said communication.

In some embodiments, the device operating system may comprise one of Windows OS, iOS, WebOS, Android, Linux, BSD, Linux and BSD derivatives, or other real time operating systems such as VxWorks, and the module operating system may comprise one of a version of Linux or a real-time operating system (RTOS). The smart edge module may further comprise a pre-processing module configured to filter or transform the raw data.

In further aspects, an electronic device is provided, comprising: a device processor executing a device operating system (OS); a device bus; a device memory coupled to the device bus; a plurality of sensors; at least one security module, interposed between at least one corresponding sensor of the plurality of sensors and the device bus, the security module configured to receive a raw data signal from the corresponding sensor, encrypt at least part of the raw data signal to generate an encrypted signal, and transmit the encrypted signal to the device bus.

The electronic device may further comprise a device driver residing in the device memory and configured to facilitate communication between the device processor and the security module. The security module may comprise a module processor running a module operating system different from the device operating system. The security module may further comprises: an interface adapter configured for receiving the raw data from the corresponding sensor; a bus adapter configured for handling communications with the device bus; a module bus coupled to the interface adapter and bus adapter. The security module may be fabricates as a system on a chip. The security module may further comprise a command filter configured to discard unauthorized communication directed at the module processor. The electronic device may further comprise a pre-processing module configured to filter the raw data signal and generate a filtered signal, wherein encrypting at least part of the raw data signal comprises encrypting the filtered signal.

According to further aspects, implemented in an electronic device having a device processor running a device operating system on a device bus and communicating with a plurality of sensors, a method is provided, comprising: providing a plurality of security modules and interposing each between a corresponding sensor of the plurality of sensors and the device bus; operating each of the security modules to perform the steps of: intercepting raw data signal output from the corresponding sensor; encrypting at least part of the raw data signal to generate encrypted signal; and transmitting the encrypted signal onto the device bus.

The method may further comprise maintaining a secure contract in a module memory of each of the security modules, and updating the security contract with decryption key and list of authorized readers. The method may further comprise maintaining a distributed version-control system for tracking changes in the security contract. The method may further comprise operating each of the security modules to perform the further steps of: intercepting each transmission of the device bus directed at the security module; and decrypting the transmission and deciphering whether a header in the transmission is acceptable header and, if yes, decrypting the remainder of the transmission; otherwise discarding the transmission. Deciphering whether the header in the transmission is acceptable header may comprise determining whether the transmission is a response to an outstanding request issued by the security module. The method may further comprise filtering the raw data signal to generate a filtered signal, wherein encrypting at least part of the raw data signal comprises encrypting the filtered signal.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

The following detailed description provides examples that highlight certain features and aspects of the innovative secure sensors system claimed herein. Different embodiments or their combinations may be used for different applications or to achieve different results or benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

In the various disclosed embodiments, data security is ensured by implementing the security processes at the edges of the technology stack. For example, data generated at the edges (i.e., by sensors) is pre-processed and encrypted at the edges upon creation. The encrypted data then remains secured throughout its transmissions and processing, until it is ready to be consumed at another edge (e.g., by another sensor), at which point it is decrypted. In this manner, any interception of the data prior to authorized consumption is able to only obtain encrypted data, which can't be deciphered without the proper key. A blockchain smart contract may be used to ensure that only authorized stakeholders can decide who will have access to the data, the metadata and the identity of the data generator. The smart contract defines stakeholders, device configuration, appropriate encryption keys for stake holders, ACL "Access Rights" to configuration (View, Modify), data (View), and meta-data. The smart contract may be maintained using GIT protocol, which is a distributed version-control system for tracking changes. The hash value of events and changes can be stored to global blockchain and when retrieved can be used by stakeholders to find correct versions and as validation.

Figure 1:
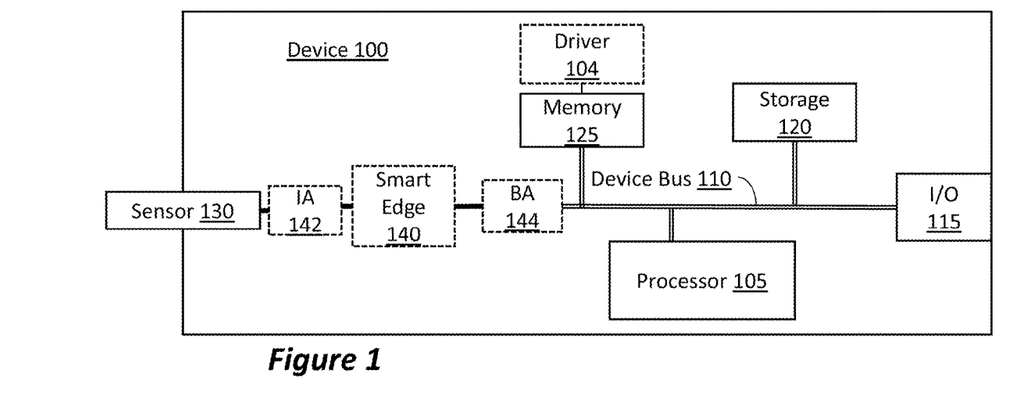
FIG. 1 illustrates a block diagram of an electronic device according to one embodiment.

FIG. 1 is block diagram schematically illustrating elements of an electronic device 100, according to an embodiment implementing edge security. Device 100 may be any electronic device, such as, e.g., a computer, a cellphone, a smart thermostat, a wearable device, etc. Device 100 may include many elements; however, only elements pertinent to the understanding of the embodiment are included in FIG. 1. For further clarity, in FIG. 1 elements that are conventional to device 100 are shown in solid lines, while elements that are novel and added by the embodiment are illustrated in dotted lines.

The device 100 is managed by a device processor 105 (e.g., iPhone Ax processor, Samsung's Exynos processor, Intel Core ix processors, etc.), executing instructions of an operating system (OS, e.g., Windows, iOS, WebOS, Android, etc.), and which communicates over device bus 110. IN cases where the device is an IoT, the Os may include Linux, BSD, Linux and BSD derivatives, or other real time operating systems such as VxWorks. The device bus 110 is connected to I/O module 115, which may include wired elements, such as Ethernet connection, and/or wireless elements, such as, e.g., WiFi, cellular, Bluetooth transceivers (not shown). Storage 120 is also attached to the bus 110, and may be used to store programs, data, etc. Memory 125 is used by processor 105 to save items needed for current processes, including running OS. Memory 125 is generally a cache memory.

Device 100 may include several sensors 130, but for simplicity only one is illustrated. Sensor 130 may be, e.g., microphone, imaging sensor, accelerometer, etc. Sensor 130 is illustrated partially outside the box of device 100, to indicate that it may be internal or external to the device 100. For example, a cellphone has an internal microphone, but may also use an external microphone as a part of a wired or wireless headset.

In the prior art devices, when sensor 130 detects a physical event (e.g., sound generated by pressure change in the case of a microphone), sensor 130 generates a signal that includes the data corresponding to the physical event. The signal of sensor 130 is sent over the device bus 110 to the processor 105. The processor 105 may operate on the signal, store the data in storage 120, and/or transmit the signal over I/O module 115. Thus, a hacker able to exploit vulnerability in the device's security system can get access to the processor 105 and/or storage 120, and thereby to the data. Similarly, a hacker able to intercept communication sent from the I/O module 115 may be able to gain access to the data.

The embodiment of FIG. 1 prevents access to the sensor data, even upon a breach of security measures. Specifically, a security module 140, referred to herein as smart edge module, is interposed between the sensor 130 and processor 105. The smart edge 140 intercepts the signal with the raw data from the sensor, prior to the signal reaching the processor 105. The smart edge 140 encrypts the data and issues an encrypted signal to the processor 105. The processor 105 only receives encrypted data, such that when the processor stores or transmits the data, it is already encrypted. Consequently, any breach which gains access to the processor 105, the storage 120, or intercepts a transmission, may only obtain the encrypted signal and thus be unable to decipher the data.

A device driver 104 resides in memory 104 and provides the communication link between the outside world and the smart edge 140, akin to a printer driver or any other device driver that enable communication with peripherals. Since driver 104 operates outside of the smart edge 140, it is considered to be operating in an insecure environment, and thus everything it handles is already encrypted. Driver 104 is responsible for transferring encrypted data to the smart edge (and sensor 130) and is responsible for transferring encrypted data to a targeted location (e.g., processor 105). Since the data handled by driver 104 is encrypted, corruption of the device driver 104 could cause an interruption of service, but could not cause a data leak.

In order to make smart edge 140 universal for all sensors and buses, an interface adapter 142 handles transmissions between the smart edge 140 and sensor 130, while bus adapter 144 handles transmissions between smart edge 140 and device bus 110. Device bus 110 may be any known bus technology, such as, e.g., Direct Memory Access, SPI, Ethernet, etc.

With the embodiment of FIG. 1, data from sensor 130 is secured and cannot be deciphered without a decryption key. Going back to the example of a hacker taking control over a camera by infiltrating the processor 105, by implementing the embodiment of FIG. 1, the hacker may only receive an encrypted transmission and will be unable to view the images from the camera, i.e., sensor 130.

Figure 2:
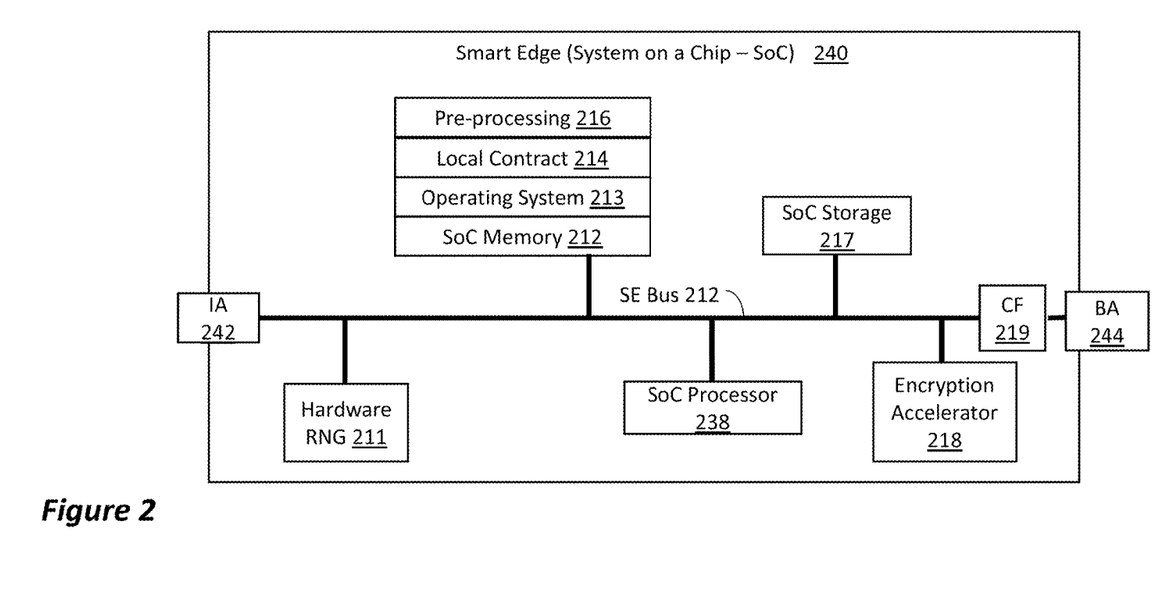
FIG. 2 illustrates a block diagram of a smart edge module according to an embodiment of the invention.

FIG. 2 illustrates an embodiment of smart edge 240, implemented in this example as a system on a chip (SoC). As shown in this example, the smart edge 240 incorporates the interface adapter 242 and bus adapter 244 to handle communication with elements outside the smart edge SoC 240. Communications within smart edge 240 run on internal bus 212, which is considered secure by the smart edge 240. The operations of the smart edge 240 are controlled by the smart edge (SE) processor 238, which executes secured operating system 213, residing in a secure smart edge memory 212.

The OS 213 may be implemented as a minimal version of Linux such as Busybox or a real-time operating system (RTOS). In order to maximize security, all unnecessary functionality is removed from both the OS and from necessary protocol stacks. In addition the OS is protected by command and response filters (CF 219). The CF 219 ensures that only necessary commands are passed to the local smart edge OS 213. The purpose is to ensure that it is not possible to trigger unknown OS behavior (e.g., prevent "magic packets"). Response Filters insure that responses to commands can only include known information targeted at known locations.

Smart edge storage 217 is used, among others, to store the local operating system, the un-encrypted Smart Contract (i.e., Configuration Data), local authentication program and local programs. The smart edge storage 217 may also act as a cache for storing sensor data and metadata/logs until successful network transmission.

In this embodiment, all elements outside of the smart edge are considered unsecured, and all elements within the smart edge are considered secured. This is ensured by prohibiting any communication into the smart edge in non-encrypted form. All inbound communications and/or data must be encrypted by a known key to be accepted and handled by the smart edge. Similarly, all outbound communication from the smart edge must first be encrypted.

Anything outside the smart edge that exists in a non-encrypted format or in an encrypted format by an unknown key is assumed unsecure. Consequently, the sensor data exists in a non-encrypted format only inside the secured smart edge. The sensor data can exit the smart edge only in a secure encrypted form. The encryption may consist of public or private key encryption technology including but not limited to Advanced Encryption Standard (AES) and/or Transport Layer Security (TLS). Decryption of the encrypted data could require multifactor authentication, using a combination of keys.

The encryption of the raw data may be performed according to instructions of a local contract 214 stored in the module memory. For increased security the local contract 214 may be a blockchain contract. The hardware random number generator RNG 211 and optional encryption accelerator 218 may be used for the encryption and decryption functions. The initial key is set at the factory in the initial local smart contract and must be replaced by the purchaser before use. The initial key is assumed to be unsecure.

As indicated, everything outside the smart edge is considered non-secured. Since driver 104 resides in memory 125, outside the smart edge, it is considered non-secured. On the non-secure side, standard IT procedures may be used to limit incoming information to known hosts using standard firewall technology. Also, TLS (Transport Layer Security) may be used in the unsecure transmission to "wrap" the encrypted information that is being sent to the smart edge, so as to prevent eavesdropping, tampering and/or message forgery.

In one embodiment, when a transmission is received addressed to the sensor 130 or smart edge 140, the non-secure driver 104 may perform a basic check of entropy (randomness) as a "first level" indication of encrypted content. If accepted, the transmission is then inspected by the command filter 219, which attempts to decrypt the file using its private key and look for header information inside the encrypted packet. If the correct heather is found, the process would continue decrypting the payload; otherwise the packet(s) would be discarded. This process is one example of ensuring that only encrypted transmission reaches the smart edge, thus thwarting any malicious attempt to disrupt or alter the operation of the smart edge.

Generally, incoming data transmission would fall into one of five categories: 1) Smart Contract Updates that were requested; 2) Responses to verification/validation requests to configured smart edges (per smart contract); 3) Requests for verification/validation from configured smart edges (per smart contract); 4) Responses for requests for blockchain update (per smart contract); and 5) Pushed blockchain updates (if configured in smart contracts). Also, all contact with smart edge should be originating from known entities and the majority of communication would be coming in response to a request that was sent by the smart edge. Moreover, for highly secure uses, it would be possible for the smart edge to only allow polled responses and reject all other communications. In this case, when the packet header is decrypted, the packet would be discarded if it did not come from the appropriate sender and in response to the correct outstanding request.

Figure 3:
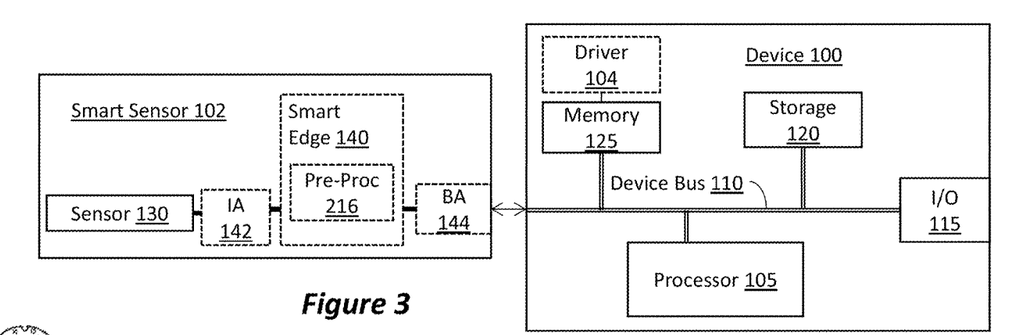
FIG. 3 illustrates a block diagram of a "stand-alone" smart edge module according to an embodiment of the invention.

As indicated above, there are applications wherein the sensor is an element that is separate from the electronic device 100. For example, a cellphone may be operated with a wired or wireless headset, such that the microphone is not an integral part of the device, i.e., the cellphone. FIG. 3 is a block diagram illustrating how the smart edge may be implemented in such applications. The device 100 is shown separate from the smart sensor 102, which is a stand-alone smart sensor incorporating a smart edge 140. In this example, the bus adapter 144 may be, e.g., a Bluetooth device communicating with device bus 100 via a corresponding Bluetooth interface of device 100. In this manner, all of the data from the sensor, e.g., microphone, 130 is transmitted to the device 100, e.g., cellphone, in an encrypted format.

FIG. 3 illustrates another feature that may be implemented in any of the embodiments disclosed herein. Specifically, the smart edge module 140 incorporates a pre-processing module 216 (see also FIG. 2). Pre-processing module 216 conditions and filters the data from the sensor prior to encryption and transmission of the data. This is done, for example, to reduce the amount of data transmitted, such that only usable data is being encrypted and transmitted. To illustrate, turning back to the example wherein sensor 130 is a microphone, part of the raw signal from sensor 130 may include background noise, wind noise, etc. Pre-processing module 216 is configured to operate on the raw signal so as to filter out raw signal that is not from the person speaking into the microphone. The filtering may be done, e.g., by setting a minimum and maximum decibel levels, by setting a frequency range, etc. Consequently, only the signal relating to the spoken words is being encrypted and transmitted. Incidentally, this pre-processing also preserves battery life, as the power requirements of the filtering is much lower than the power requirement of the transmission of all the data from the microphone.

In this aspect, a smart sensor is provided, comprising: at least one sensor generating raw data signal; an interface adapter facilitating communications with the at least one sensor; a smart edge having a processor receiving the raw data signal and generating an encrypted data signal; and a bus adapter transmitting the encrypted data signal. The bus adapted may comprise a wireless transceiver. The smart edge may further comprise a pre-processing module configured to filter the raw data signal prior to the processor generating the encrypted data signal. In this respect, the processor encrypts only part of the raw data signal corresponding to a filtered signal.

Figure 4:
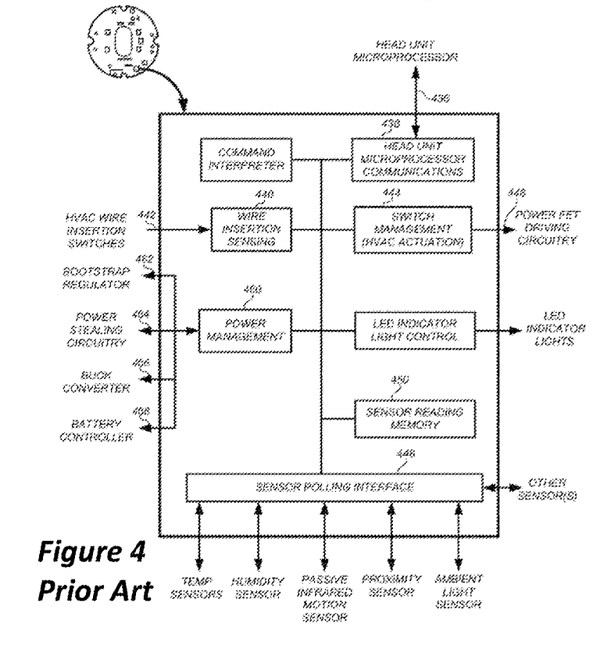
FIG. 4 is a prior art illustration of a smart thermostat.

FIG. 4 illustrates a prior art "smart" thermostat, and corresponds to FIG. 4B disclosed in U.S. Pat. No. 8,622,314. As shown, the smart thermostat receives signals from several sensors, such as temperature sensor, humidity sensor, etc. The signal from these sensors is a raw signal and is being polled by the sensor polling interface. Consequently, a hacker gaining access to the thermostat has direct access to all of the raw data from the sensors. This can be prevented by using a smart edge to encrypt the data of the sensors prior to transmission to the thermostat.

Figure 5:
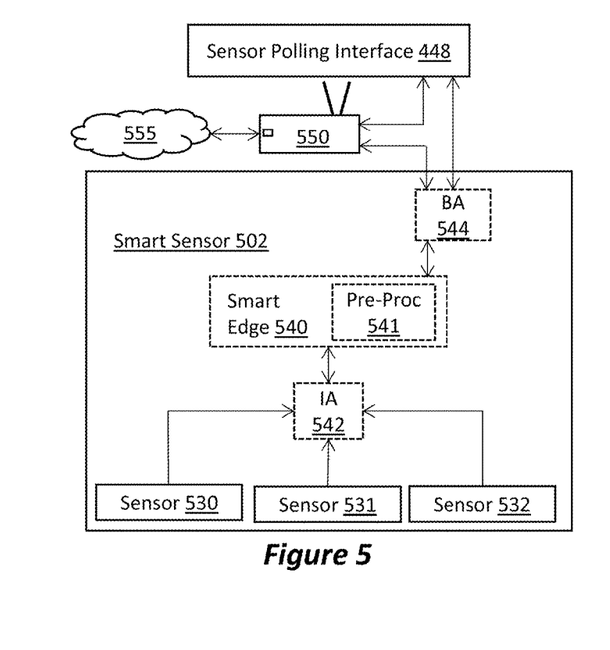
FIG. 5 illustrates a block diagram of a smart edge module implemented for the smart thermostat of FIG. 4, according to an embodiment of the invention.

FIG. 5 illustrates an embodiment of a stand-alone smart sensor, implemented in the context of a device such as the smart thermostat of FIG. 4. As before, FIG. 5 illustrates advantageous features that may also be implemented within the other embodiments and are not limited to their use in the embodiment of FIG. 5. For example, as illustrated in FIG. 5, smart sensor 502 actually includes a plurality of sensors, 530, 531, 532, etc. That is, the disclosed smart edge 540 is not limited to handling raw data of a single sensor, but can be implemented in arrangements wherein several sensors are coupled to a single smart edge 540. In the context of the smart thermostat, a single smart edge 540 may handle all of the raw data from all of the sensors.

Another feature illustrated in FIG. 5 is the option to have the bus adapter 544 communicate directly with the electronic device, e.g., the sensor polling interface 448 of the thermostat, or interface directly with a network via, e.g., modem 550. Notably, by having bus adapter 544 set as a WiFi transceiver communicating with the modem 550, the encrypted data can be utilized with several authorized devices, and is not limited to only a single device. For example, the smart thermostat can access the data by communicating with the smart sensor via modem 550 in an intranet fashion, while a cellphone may access the data remotely via connection to the Internet 555.

Incidentally, for clarity the embodiment of FIG. 5 is illustrated as retaining the polling interface 448. However, it is not necessary to include the poling interface 448. Rather, the data may be encrypted and transferred in a fashion that does not necessitate the polling, or can be transferred to a location that can be polled.

The embodiment of FIG. 5 decouples the generation and encryption of the sensor data from the consuming of the data. Consequently, the generated encrypted data can be consumed by all authorized devices. Such an implementation is particularly useful in IoT applications. For example, a smart LED light bulb can be implemented using the embodiment of FIG. 5. In such an implementation, the bus adapter 544 would be communicating directly with the modem 550, enabling any authorized device to receive the signal from the light bulb and control the operation of the light bulb.

In this aspect, a smart sensor is provided, comprising: a plurality of sensors, each generating raw data signal; an interface adapter facilitating communications with the plurality of sensors; a smart edge having a processor receiving the raw data signal from each of the plurality of sensors and generating an encrypted data signal; and a bus adapter transmitting the encrypted data signal. The bus adapted may comprise a wireless transceiver. The smart edge may further comprise a pre-processing module configured to filter the raw data signal of each of the sensors prior to the processor generating the encrypted data signal.

Figure 6:
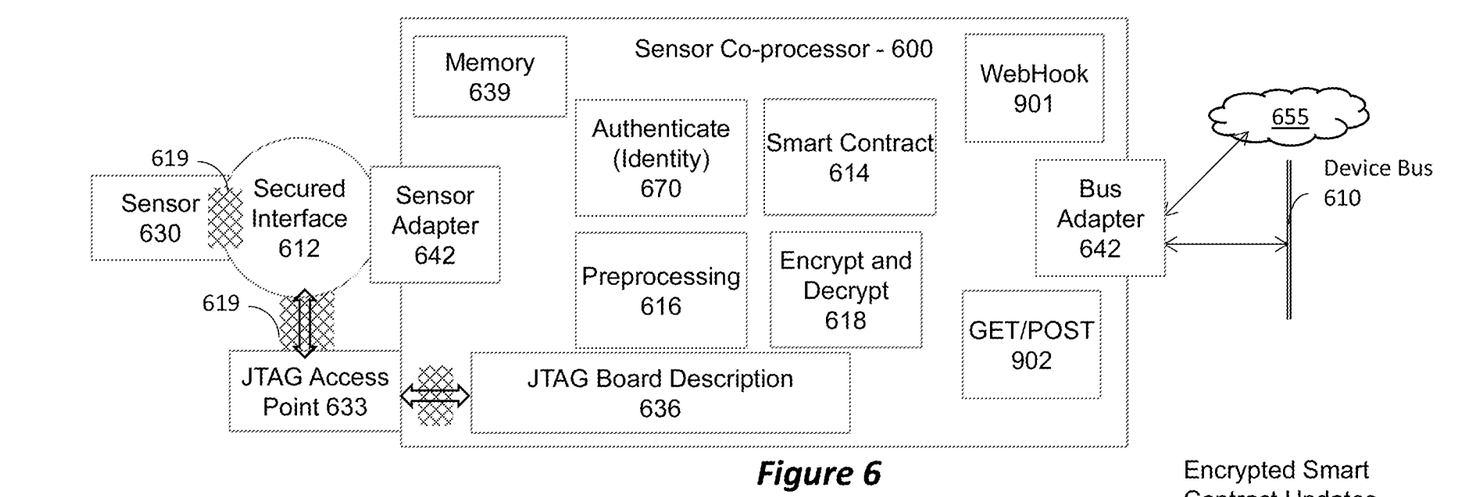
FIG. 6 is a high-level schematic of a co-processor according to an embodiment.

FIG. 6 is a high-level schematic of a co-processor according to an embodiment wherein the sensor and co-processor are not necessarily part of an electronic device. Sensor 630 communicates with the co-processor 600 via secured interface 612. The secured interface 612 enables communications between the sensor 630 and sensor adapter 642, which is similar to IA 142 of FIG. 3 or IA 542 of FIG. 5. The co-processor 600 incorporates an encrypt/decrypt module 618, a preprocessing module 616, and an authenticator 670. The co-processor communicates with a device bus 610 or a network 655, such as the Internet, via the bus adapter 642, using the WebHook and/or get/post modules 901 and 902. All communication and signal processing is performed per the provisions of the smart contract 614.

Securing and maintaining the integrity of the interface 612 may be accomplished in various ways. For example, the sensor 630, interface 612 and co-processor 600 can be embedded in adhesive material such as but not limited to epoxy-like material. Optionally combined with but not limited to conductive material such as wire or wire mesh to prevent physical tempering. In some embodiments JTAG (Joint Test Action Group) is implemented and its test access points are also embedded in adhesive material such as but not limited to epoxy-like material and optionally combined with but not limited to conductive material such as wire or wire mesh, to thereby prevent physical tempering and avoid malicious hardware-based attacks. Notably, if the wire is cut, the current stops flowing so that physical attack is detected. The device then follows the smart contract instructions, which may but are not limited to, notification and/or wiping of smart edge contents. Thus, in disclosed embodiments physical barrier can be provided over the JTAG access point to prevent physical access to the JTAG access point.

The integrity of the connection between the sensor 630 and co-processor 600, and the PCB board/device that the co-processor 600 is mounted in can be tested using JTAG dongle/module 636 embedded in the co-processor 600. In an example, the co-processor 600 is connected to a JTAG access point 633 on the PCB board and can conduct JTAG chain scans using an optional Boundary Scan Description Language (BSDL) file describing the board that is referenced in the smart contract. Such functionality can both validate that a contract manufacturer built the PCB board as specified, and that no one intentionally or unintentionally modified the design of the physical PCB board. Thus, it also protects the board/device from physical tampering after manufacturing when in the sales/delivery channel or when deployed to the field. For improved security the JTAG access point 633 may be embedded in resin to prevent external access.

Almost every board built today has a set of JTAG test points that are used by the manufacturer to make sure the board was built as specified. In order to do this the test points are documented along with expected responses and behavior (IDs, Timing, etc.) by engineering. Manufacturing uses this database and uses an external JTAG Dongle to validate that each board is correctly built to spec and is not missing components or is laid out improperly. Disclosed embodiments implement a security measure utilizing the JTAG access points. In disclosed examples the Smart Edge is configured so that it validate that it is mounted to a board that was built as expected, and that the secure interface and sensors are connected properly and none have been tempered with.

In disclosed examples, engineering documentation describing the expected results of a JTAG scan (i.e., describing how the board is laid out and expected results) is encrypted and stored in the smart edge storage memory. A link to the storage location is included in the smart contract. An interface is provided to securely connect the smart edge to the JTAG access points. This connection includes physical barriers to prevent physical access to the JTAG access points. A JTAG module is included in the smart edge co-processor enabling the co-processor to interrogate the JTAG chain via the JTAG access points and compare the results to the results indicated in the documentation stored in the smart contract. Thus, in essence, in these embodiments the co-processor executes a self-testing to verify that all of the elements of the system have been assembled properly and have not been tempered with.

Figure 7:
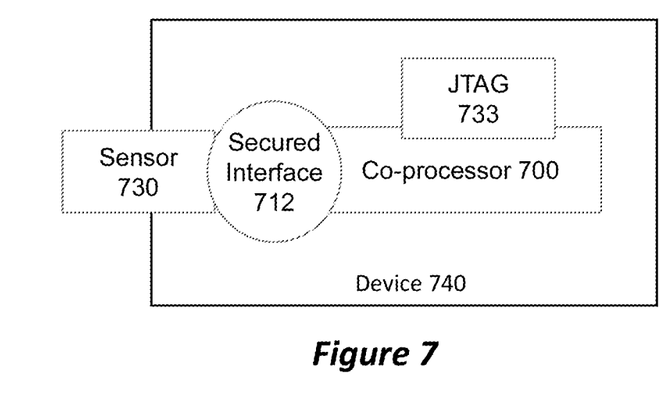
FIG. 7 illustrates an example wherein the sensor and co-processor are part of an electronic device.

An example where the sensor and co-processor are integral part of an electronic device is illustrated in FIG. 7. In FIG. 7, device 740 may be, e.g., a mobile device such as a smartphone. Sensor 730 may be any of the standard sensors incorporated in a cellphone, such as a microphone, an accelerometer, a light sensor, a pressure sensor, etc. A secured interface 712, implemented according to any of the examples provided herein, facilitates communication between the sensor 730 and the co-processor 700. Both interface 712 and co-processor 700 have connections to the JTAG 733 of device 740. In this example, the co-processor 700 incorporates a JTAG dongle in order to conduct boundary scans on both the device 740 and the secured interface 712 to verify and authenticate the device, the interface and the sensor. The PCB board's Boundary Scan Description Language (BSDL) file describing the device 740 and the secured interface 712 is provided by optional URI (Uniform Resource Identifier) located in the smart contract (e.g., 614). Once the BSDL file is retrieved from the URI, it may be stored locally by the co-processor 700. The co-processor 700 uses the JTAG test access points 733 to validate that the device 740, the PCB board and the secured interface 612 have not been modified. The secured interface 712 is epoxy wired with a chain of JTAG interfaces 733 to provide anti-tampering measures.

In the embodiments, the co-processor 600 may support three connection types. A serial interface enables communication to a JTAG access point on the board/device that the co-processor 600 is mounted in. Communications with the secured interface 612 may be accomplished through the sensor interface adapter 642. Communications with a device bus 610 or a network 655 can be accomplished via the bus adapter 642 using TCP/IP module supporting HTTPS (GET, PUT, POST, DELETE, PATCH—902) and an HTTPS based Webhook 901. Optionally a GraphQL interface and/or streaming interface, such as Data Stream Interface (DSI), may also be supported to enable interactions with API's and other applications.

Figure 8:
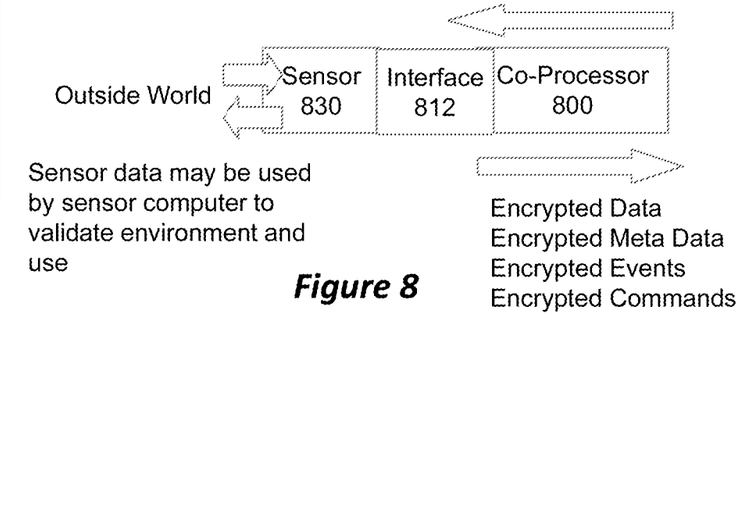
FIG. 8 is a schematic illustrating communication channels according to an embodiment.

An example of various communications of the co-processor is provided in FIG. 8. Using the various communication channels, the co-processor 800 receives information about the physical world through the sensor 830 or sends information to the outside world using the sensor 830, in the form of an output device such as a speaker, monitor, or other output device. The TCP/IP interface receives encrypted information that can include smart contract updates, Blockchain updates, functions/algorithms, inferences, events, etc. The TCP/IP interface sends encrypted information that can include data, metadata, events, commands, etc.

Among the functions that may be performed by the co-processor are environment authentication and cyber-attack identification and filtering. The co-processor can be used to locally monitor external phenomena received through the sensor using a locally deployed function or inference. Inferences can be deployed to fingerprint and authenticate the external environment. These inferences may be shared with peers configured in a smart contract in order to validate the environment and/or mesh (community). Inferences or functions can be programmed to detect false input or signs of cyber-attacks and to implement filters on identification of an attack in order to mitigate the effect of the attack. For example, the detection of a laser pointer focused on the video input on a self-driving car, the jamming of a GPS receiver, or a targeted sound attacks on road noise sensors. Mitigation could include filtering targeted sound and raising an alarm of active cyber-attack. The benefits of running these inferences locally include the speed of response, implementation of mitigation, and fast notification.

Figure 9:
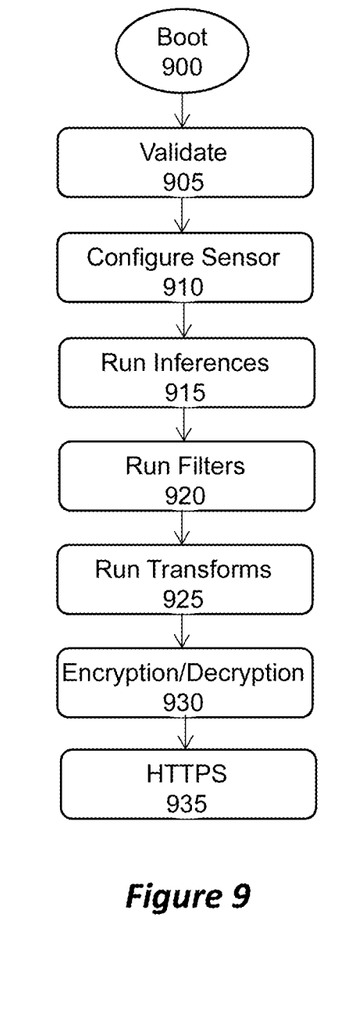
FIG. 9 is a flow chart illustrating processes that may be executed by the co-processor, according to embodiments.

In order to ensure no tempering has been done during the chain of custody from manufacturing to the final user, the following operations may be implemented, as illustrated in FIG. 9. The elements illustrated in FIG. 9 are not necessarily steps in a sequential process, but rather individual processes that may be executed by the co-processor as needed.

On boot 900, the co-processor proceeds to validate that the device and sensor interface were not tampered with by interrogating JTAG chains and match to the design as specified in the smart contract. Illustrated by process 905. If validation is positive, the sensor is configured by process 910. An optional interference or function module 915 to validate external environment is run on the raw data stream to determine whether a physical attack is being executed against the sensor, such as laser light, white noise, etc. Facilities to tap the raw data stream may be provided in order to visualize the data stream during model building stages to determine features for extraction.

Next, in process 920 a chain of 0 to N filters are applied to the data stream. The purpose of these filters is to reduce the data set that must be processed to match the data features targeted for extraction. Examples of filters include max, min, standard deviation, and sampling. In process 925 a chain of 0 to N transforms are applied. The purpose of these transforms is to further process the data in order to reduce the data set, and to extract and amplify the features selected. Transforms may include fixed or custom functions and/or artificial intelligence inferences. Transforms may be used to output data sets in a specific format, output partial inference models, or output predictions generated by local inferences, including generating lambda expressions and/or one-hot encoding. Example output formats may include: JSON, Flatbuffer, Numpy Array, Pandas Data Frame, Tensorflow Dataset, and .csv.

Once the sensor stream is fully transformed, the output is encrypted (930) and sent to the location specified in the smart contract. The transform facilities can be used to optionally watermark the output signal. An example would be to integrate a sound pattern (beep, etc.) or a video pattern (blink, etc.) into the output signal to enable authentication and verification.

In process 935 data may be received (e.g., via webhook) for output to the sensor (e.g., speaker, screen, etc.). The received data is decrypted and sent as output stream to the sensor.

The Note that some or all of the components, modules and/or processes as shown and described herein may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Although some of the processes or methods are described above in terms of some sequential operations, it should be appreciated that some of the operations described may be performed in a different order. Moreover, some operations may be performed in parallel rather than sequentially.

Disclosed embodiments provide a method implemented in an electronic device having at least one sensor and at least one pre-processor communicating with the sensor via a secured interface, the method comprising upon boot of the device, causing the co-processor to: read authentication parameters from a smart contract stored in memory of the electronic device; execute a JTAG interrogation to authenticate and validate the sensor and the secured interface according to the authentication parameters. The method may further comprise during continued operation of the electronic device, causing the co-processor to receive sensor signal via the secured interface and execute a filter module on the sensor signal to generate reduced data and encrypt the reduced data. Also, during continued operation of the electronic device, the method may comprise causing the co-processor to execute an interference module on the sensor signal to detect physical attack against the sensor.

Figure 10:
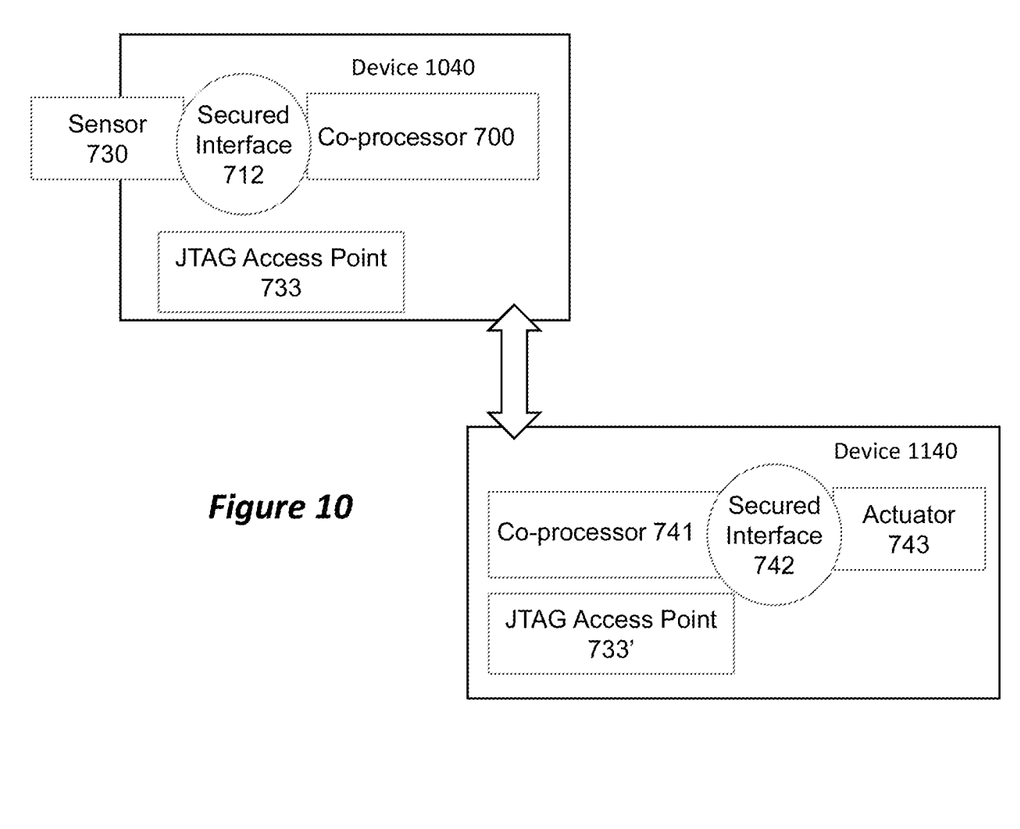
FIG. 10 illustrates an embodiment of secured interaction between a sensor and an actuator.

FIG. 10 illustrates an embodiment of secured interaction between a sensor and an actuator. Each of devised 1040 and 1140 may be structured according to embodiments disclosed here, e.g., similar to device 740 shown in FIG. 7. Device 1040 has at least one sensor 730, although it may have more than one and may additionally have actuators. Device 1140 has at least one actuator 743, although it may have more than one and may additionally have sensors. As noted, within this disclosure actuator may be considered as sensors for shorthand. Thus, the discussion regarding device 740 with sensor 730 is equally applicable to device 1140 with actuator 743, coupled to secured interface 742 and co-processor 741. The only difference is the signal flow, which in device 1140 the signal arrives encrypted and is decrypted and conditioned by co-processor 741 prior to transmission to the actuator 743 via the secured interface 742.

Thus, in terms of device 1140, a smart edge module is configured to receive an encrypted electronic signal and generate a corresponding physical events, comprising: an actuator receiving actuating signal and generating a physical event corresponding to the actuating signal; a co-processor receiving the encrypted electronic signal and generating the actuating signal therefrom, and providing the actuating signal to the actuator; a secured interface inserted between the actuator and the co-processor and enabling communication between the actuator and the co-processor; a communication interface handling communications between the co-processor and devices external to the smart edge module; and, an authentication module authenticating the construction and functionality of the actuator and the secured interface. The authentication module may comprise a JTAG access point, wherein the co-processor and the secured interface are connected to the JTAG access point; a JTAG module executed by the co-processor; and, an encrypted JTAG specification library stored within the smart edge. A physical barrier may be included, preventing physical access to the JTAG access point.

While this invention has been discussed in terms of exemplary embodiments of specific materials, and specific steps, it should be understood by those skilled in the art that variations of these specific examples may be made and/or used and that such structures and methods will follow from the understanding imparted by the practices described and illustrated as well as the discussions of operations as to facilitate modifications that may be made without departing from the scope of the invention defined by the appended claims.

What is claimed is:

1. An electronic device, comprising:
   a device processor executing a device operating system (OS);
   a device bus;
   a device memory coupled to the device bus;
   a plurality of sensors;
   a JTAG access point
      at least one security module, implemented using at least a hardware processor, interposed between at least one corresponding sensor of the plurality of sensors and the device bus, the security module coupled to the JTAG access point and configured to execute a JTAG interrogation calls to authenticate at least the plurality of sensors; and,
   a plurality of secured interfaces, each interposed between a corresponding sensor and the security module and each having connections to the JTAG access point; wherein the JTAG access point and the connections to the JTAG access point are embedded in epoxy.

2. The electronic device of claim 1, wherein the security module further comprises:
   module memory incorporating a smart contract module specifying parameters for authentication process performed by the JTAG interrogation calls.

3. The electronic device of claim 1, wherein the security module comprises an interference module validating external environment to detect physical attacks.

* * * * *